US011510250B2

(12) United States Patent
Dai et al.

(10) Patent No.: US 11,510,250 B2
(45) Date of Patent: Nov. 22, 2022

(54) GENERATING A SCRAMBLED PAYLOAD USING AN INITIALIZATION SCRAMBLING SEQUENCE

(71) Applicant: ZTE Corporation, Guangdong (CN)

(72) Inventors: Jianqiang Dai, Guangdong (CN); Yuzhou Hu, Guangdong (CN); Junfeng Zhang, Guangdong (CN); Li Tian, Guangdong (CN)

(73) Assignee: ZTE Corporation, Shenzhen (CN)

( * ) Notice: Subject to any disclaimer, the term of this patent is extended or adjusted under 35 U.S.C. 154(b) by 201 days.

(21) Appl. No.: 17/102,300

(22) Filed: Nov. 23, 2020

(65) Prior Publication Data

US 2021/0105830 A1   Apr. 8, 2021

Related U.S. Application Data

(63) Continuation of application No. PCT/CN2019/092934, filed on Jun. 26, 2019.

(51) Int. Cl.
*H04W 74/08* (2009.01)
*H04W 48/08* (2009.01)
*H04W 72/04* (2009.01)

(52) U.S. Cl.
CPC ....... *H04W 74/0833* (2013.01); *H04W 48/08* (2013.01); *H04W 72/042* (2013.01); *H04W 72/0466* (2013.01)

(58) Field of Classification Search
CPC .............. H04W 48/08; H04W 72/042; H04W 72/0466; H04W 74/0833

(Continued)

(56) References Cited

U.S. PATENT DOCUMENTS

2019/0320457 A1* 10/2019 Maaref ................. H04W 76/27
2022/0086915 A1*  3/2022 Canonne-Velasquez ....................
                                                   H04W 74/0833
2022/0124813 A1*  4/2022 Cao ........................ H04W 76/11

FOREIGN PATENT DOCUMENTS

CN      109792728 A    5/2019
EP        3910857 A1   11/2021
(Continued)

OTHER PUBLICATIONS

3GPP: "3rd Generation Partnership Project; Technical Specification Group Radio Access Network; NR; Physical channels and modulation (Release 15)", 3GPP Standard; Technical Specification; 3GPP TS 38.211, 3rd Generation Partnership Project (3GPP), Mobile Competence Centre; 650, Route Des Lucioles; F-06921 Sophia-Antipolis Cedex; France, [Online] vol. RAN WG1, No. V15.6.0, Jun. 24, 2019 (Jun. 24, 2019), pp. 1-97, XP051754325, 3GPP Retrieved from the Internet: URL:www.3gpp.org.

(Continued)

*Primary Examiner* — Rownak Islam
(74) *Attorney, Agent, or Firm* — Perkins Coie LLP

(57) ABSTRACT

Methods, systems, and devices related to digital wireless communication, and more specifically, to techniques related to generating a scrambled payload that distinguishes a wireless device using an initialization scrambling sequence. In one exemplary aspect, a method for wireless communication may include generating a scrambled payload, where the scrambled payload is generated using an initialization scrambling sequence that is at least partially based on a preamble index and includes a length of 31 bits. The method also may include transmitting a first message to a communication node during a random access procedure, the first message including the scrambled payload.

10 Claims, 9 Drawing Sheets

(58) Field of Classification Search
USPC .......................................................... 370/329
See application file for complete search history.

(56) References Cited

FOREIGN PATENT DOCUMENTS

| WO | 2018/165872 A1 | 9/2018 | | |
|---|---|---|---|---|
| WO | WO-2019023423 A1 | * | 1/2019 | .......... H04J 11/0079 |
| WO | WO-2019217065 A1 | * | 11/2019 | ............. H04L 5/005 |

OTHER PUBLICATIONS

QUALCOMM Incorporated, "Channel Structure for Two-Step RACH," 3GPP TSG-RAN WG1 Meeting #97, R1-1907691, May 13-May 17, 2019, Reno, USA, 19 pages.
European Search Report for EP Patent Application No. 19930174.8, dated Dec. 15, 2021, 13 pages.
ZTE, "Feature Lead Summary #3 of 7.2.1.1 Two-step RACH Channel Structure," 3GPP TSG RAN WG1 #97, R1-1907903, Reno, USA, May 13-17, 2019, 12 pages.
Interdigital Inc., On 2-step RACH procedure, 3GPP TSG RAN WG1 Meeting #97 R1-1906859, Reno, USA, May 2019, 5 pages.
Zte et al. "Further discussions on the channel structure of msgA," 3GPP TSG RAN WG1 Meeting #97 R1-1905989, Reno, USA, May 2019, 13 pages.
International Search Report and Written Opinion dated Mar. 26, 2020 for International Application No. PCT/CN2019/092934, filed on Jun. 26, 2019 (8 pages).

* cited by examiner

GENERATING A SCRAMBLED PAYLOAD USING AN INITIALIZATION SCRAMBLING SEQUENCE

CROSS REFERENCE TO RELATED APPLICATIONS

This patent document is a continuation of and claims benefit of priority to International Patent Application No. PCT/CN2019/092934, filed on Jun. 26, 2019. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to generating a scrambled payload using an initialization scrambling sequence.

In one exemplary aspect, a method for wireless communication includes generating a scrambled payload, where the scrambled payload is generated using an initialization scrambling sequence that is at least partially based on a preamble index and includes a length of 31 bits. The method also includes transmitting a first message to a communication node during a random access procedure, the first message including the scrambled payload.

In another exemplary aspect, a method for wireless communication includes receiving a first message from a wireless device during a random access procedure, the first message including a scrambled payload, wherein the scrambled payload is generated using an initialization scrambling sequence that is at least partially based on a preamble index and includes a 31-bit length. The method also includes transmitting a random-access downlink transmission to the wireless device in response to receiving the first message.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at die same time. Other aspects, such as energy consumption, device cost, spectral efficiency, and latency are also important to meeting the needs of various communication scenarios.

This patent document describes techniques that can be implemented to generate a scrambled payload to using a random-access initialization scrambling sequence, for example, for multi-step RACH communication. A wireless device may generate a first message that includes a scrambled payload that is scrambled using an initialization scrambling sequence. The initialization scrambling sequence may be at least partially based on a preamble index and includes a 31-bit length.

Figure 1:
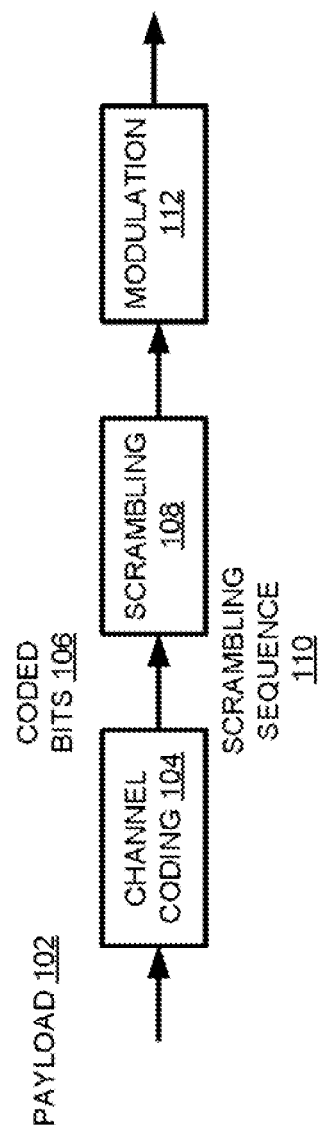
FIG. 1 illustrates a block diagram of an example transmitter procedure.

FIG. 1 illustrates a block diagram of an example transmitter procedure. The transmitter procedure as illustrated in FIG. 1 may indicate a technique to scramble a payload using a scrambling sequence.

The payload 102 may be coded by channel coding 104 to generate coded bits 106. The coded bits 106 may be scrambled into a scrambled payload 108 using a scrambling sequence 110.

In many cases, the scrambling sequence generator may be initialized with $c_{init}=n_{RNTI} \cdot 2^{15}+n_{ID}$, where $n_{ID} \in \{0, 1, \ldots, 1023\}$ may equal the higher-layer parameter dataScramblingIdentityPUSCH if configured and the Radio network temporary identifier (RNTI) may equal the C-RNTI, MCS-C-RNTI or CS-RNTI. Otherwise, $n_{ID}=N_{ID}^{cell}$, where $n_{RNTI}$ may correspond to the RNTI associated with the physical uplink shared channel (PUSCH) transmission. An example equation for initializing a scrambling sequence may include: $c_{init}=n_{RNTI} \cdot 2^{15}+n_{ID}$.

For the payload (e.g., the third message in a 4-step RACH signaling process), the parameters $n_{RNTI}$ and $n_{ID}$ may be known in the scrambling sequence. The scrambled payload 108 may be modulated 112.

However, with a payload transmission including a 2-step RACH procedure, a parameter (e.g., radio network temporary identifier ($n_{RNTI}$), temporary cell RNTI (TC-RNTI)) may be unavailable. In this event, it may be unknown how to generate the initialization scrambling sequence using an equation, such as the example equation for initializing a scrambling sequence illustrated above. It also may be unknown how to distinguish the initialization scrambling sequence per each terminal (or user equipment (UE)).

Figure 2:
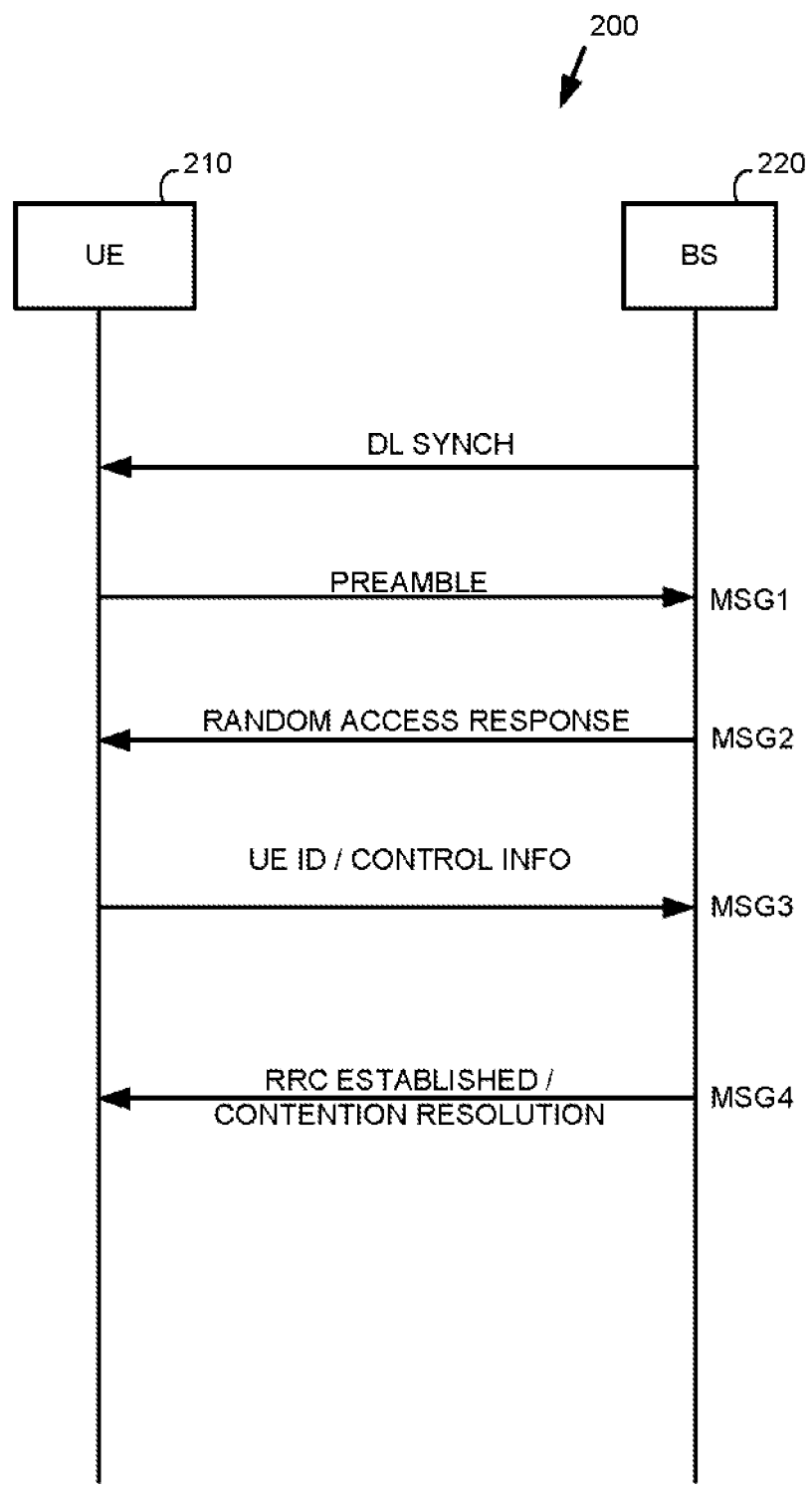
FIG. 2 illustrates a signaling process for a 4-step random access channel (RACH) procedure.

FIG. 2 illustrates a signaling process 200 for a 4-step RACH procedure. A UE 210 may establish a connection with a base station (BS) 220 and a network using a random-access procedure. For contention-based random-access, the UE 210 may obtain uplink synchronization information and a unique UE_ID upon successfully accessing the network.

As shown in FIG. 2, a first message MSG1 may include the UE 210 transmitting a random access (RA) preamble uplink transmission. A second message MSG2 may include the BS 220 transmitting an RA response downlink transmission. A third message MSG3 may include the UE 210 transmitting an uplink transmission to the BS 220 that may include a UE_ID or control information. A fourth message MSG4 may include the BS 220 transmitting a radio resource control (RRC) established/contention resolution message.

Figure 3:
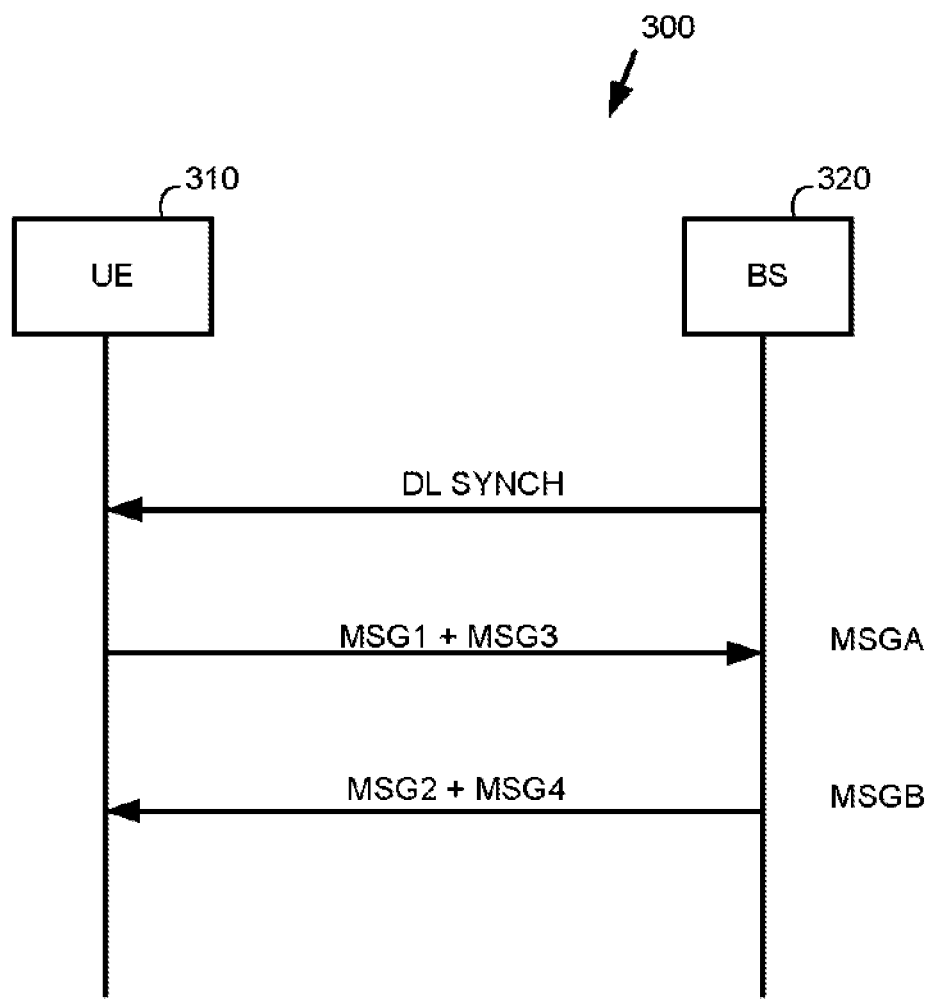
FIG. 3 illustrates a signaling process for a 2-step RACH procedure.

FIG. 3 illustrates a signaling process 300 for a 2-step RACH procedure. 2-step RACH may include a way to reduce the RA latency and downlink signaling resources. For contention-based random-access, the UE 310 may obtain uplink synchronization information and a unique UE_ID upon successfully accessing the network.

The 2-step RACH procedure may include a first message MSGA uplink transmission and a second message MSGB downlink transmission. The first message MSGA may include the UE 310 transmitting the payload and the preamble MSG1 and UE_ID/control information MSG3 as transmitted by the UE. The second message MSGB may include the BS 320 transmitting a random-access response MSG2 and RRC established/contention resolution message MSG4 to the UE 310.

In the event of transmission of the payload in MSGA, the payload may be coded and scrambled by a scrambling sequence. However, the scrambling sequence may be unable to be generated, as the parameter in the scrambling equation $c_{init}=n_{RNTI}\cdot 2^{15}+n_{ID}$ may be unavailable.

The present embodiments may relate to generating a scrambled payload using an initialization scrambling sequence and distinguish the UE in a 2-step RACH procedure. The initialization scrambling sequence may include a 31-bit length. The 31-bit length sequence may include multiple parts, such as a RNTI, preamble index, cell_ID, root index, etc.

Example Embodiment 1

Figure 4:
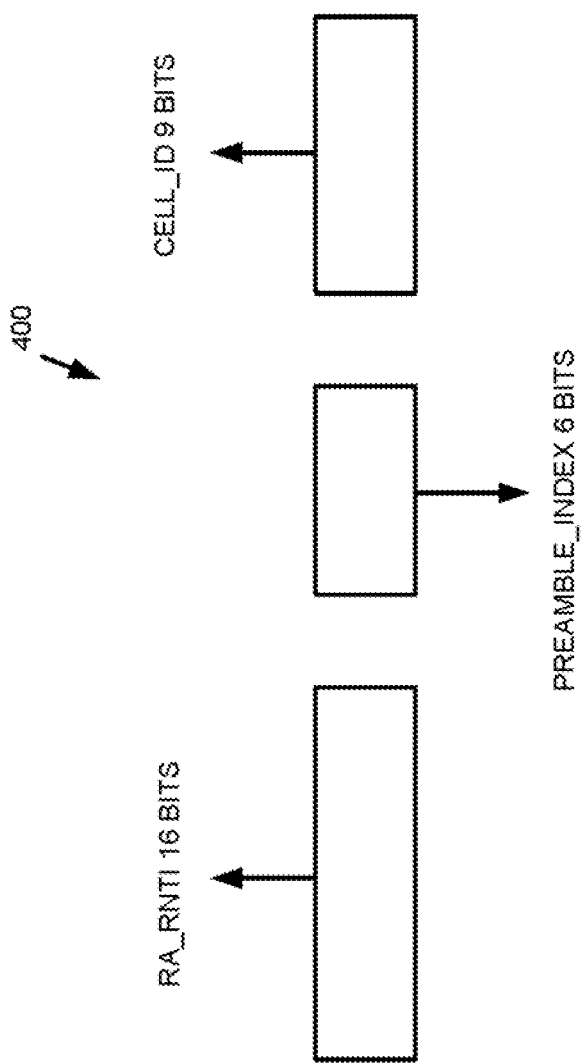
FIG. 4 illustrates a block diagram of an example 31-bit initialization scrambling sequence.

FIG. 4 illustrates a block diagram of an example 31-bit initialization scrambling sequence 400. The initialization scrambling sequence 400 may include a 16-bit RA_RNTI, a 6-bit preamble_index, and a 9-bit cell_ID. RA_RNTI may be determined by the time-frequency resource of a physical random access channel (PRACH) occasion. Cell_ID may be generated from a 10-bit cell_ID that may have 1 bit removed. The 1 bit that is removed may include the most significant bit (MSB) of the 10-bit cell_ID. In some embodiments, the 1 bit that is removed may include one of the higher 8 bits. In some embodiments, the order of the RA_RNTI, preamble_index, and cell_ID may be arbitrary. The 31-bit length sequence 400 may be illustrated by:

$$c_{init}=\text{RNTI}\cdot 2^{15}+\text{preamble\_index}\cdot 2^9+n\_\text{ID}$$

RNTI may include RA_RNTI, n_ID could be generated from a 10-bit cell_ID by removing 1 bit, and the removed bit may be the MSB of the 10-bit cell_ID. In some embodiments, RNTI could be a msgB RNTI, which may be determined by a time-frequency of PRACH occasion, which may be different from the range of RA_RNTI.

Example Embodiment 2

In a second example embodiment, the initialization scrambling sequence may contain a 16-bit RNTI, a 6-bit preamble_index, and a 10-bit cell_ID. The RNTI may be a modified RA_RNTI, which may be calculated with a legacy RA_RNTI and one bit of the 6-bit preamble_index.

The RA_RNTI may be obtained as follows: RA-RNTI=1+s_id+14×t_id+14×80×f_id+14×80×8×ul_carrier_id, where s_id identifies an index of the first OFDM symbol of the specified PRACH(0<=s_id<14), t_id identifies an index of the first slot of the specified PRACH in a system frame(0<=t_id<80), f_id identifies an index of the specified PRACH in the frequency domain(0<=f_id<8), and ul_carrier_id identifies an L carrier type (0 for NUL carrier, and 1 for SUL carrier).

In some embodiments, the MSB of the 6-bit preamble_index may be combined with an uplink carrier identifier (ul_carrier_id).

In some embodiments, the MSB of the 6-bit preamble_index may be combined with an f_id.

In some embodiments, the MSB of the 6-bit preamble_index may be combined with an s_id.

In another embodiment, the 1 bit may be one of the 6 bits of the preamble_index. In an embodiment, the order of the RNTI, preamble_index, and cell_ID may be arbitrary.

The 31-bit length sequence may be illustrated by:

$$c_{init}=\text{RNTI}\cdot 2^{15}+\text{preamble\_index}\cdot 2^{10}+n\_\text{ID}$$

The RNTI may be a modified RA_RNTI, and one bit of the 6-bit preamble index may be combined with RA_RNTI, and n_ID may be the 10-bit cell_ID.

Example Embodiment 3

Figure 5:
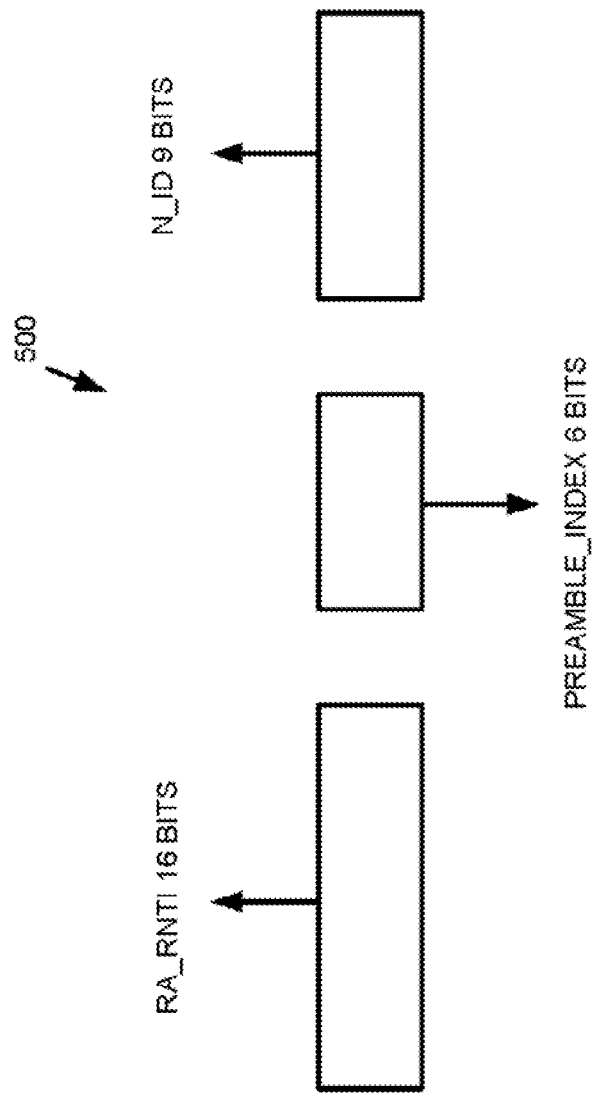
FIG. 5 illustrates a block diagram of an example 31-bit initialization scrambling sequence.

FIG. 5 illustrates a block diagram of an example 31-bit initialization scrambling sequence 500. The initialization scrambling sequence 500 may include a 16-bit RA_RNTI, a 6-bit preamble_index, and a 9-bit n_ID. RA_RNTI may be determined by the time-frequency resource of the PRACH occasion, n_ID may be a configurable 9-bit n_ID that can be different for different cells. In some embodiments, the order of the RNTI, preamble_index, and cell_ID may be arbitrary.

The 31-bit length sequence 500 may be illustrated by:

$$c_{init}=\text{RA\_RNTI}\cdot 2^{15}+\text{preamble\_index}\cdot 2^9+n\_\text{ID}$$

The n_ID may be configurable by the network. Different n_IDs may be configured for neighboring cells.

In an embodiment, for a 839-length preamble, the n_ID may include a 9-bit root_index, which may be generated from a 10-bit root_index with 1 bit removed. The root_index may be used for generating the preamble sequence.

In an embodiment, for a 139-length preamble, the n_ID may include a 8-bit root_index.

Example Embodiment 4

Figure 6:
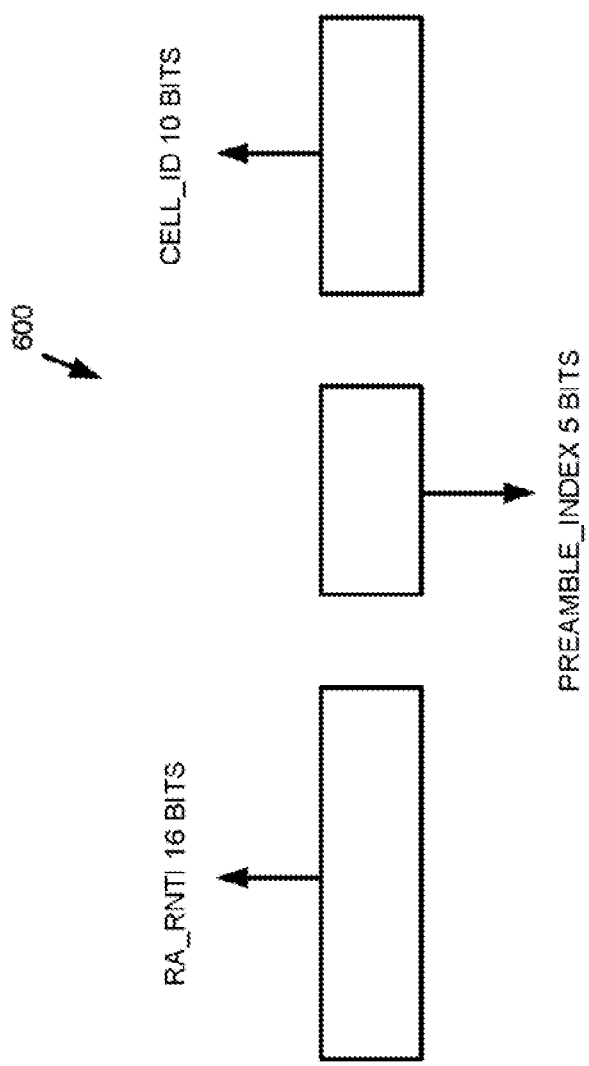
FIG. 6 illustrates a block diagram of an example 31-bit initialization scrambling sequence.

FIG. 6 illustrates a block diagram of an example 31-bit initialization scrambling sequence 600. The initialization scrambling sequence 600 may include a 16-bit RA_RNTI, a 5-bit preamble_index, and a 10-bit cell_ID. RA_RNTI may be determined by the time-frequency resource of PRACH occasion.

If the number of preamble does not exceed 32, 5 bits may be sufficient for denoting the preamble_index. If a range of a preamble_index is greater than 32, a 5-bit preamble may be generated from a 6-bit preamble index by removing 1 bit, where the removed bit may be the MSB of 6-bit preamble index. In an embodiment, the order of the RA_RNTI, preamble_index, and cell_ID may be arbitrary.

The 31-bit length sequence may be represented as:

$$c_{init}=\text{R\_RNTI} \cdot 2^{15}+\text{preamble\_index} \cdot 2^{10}+n\_\text{ID}.$$

Figure 7:
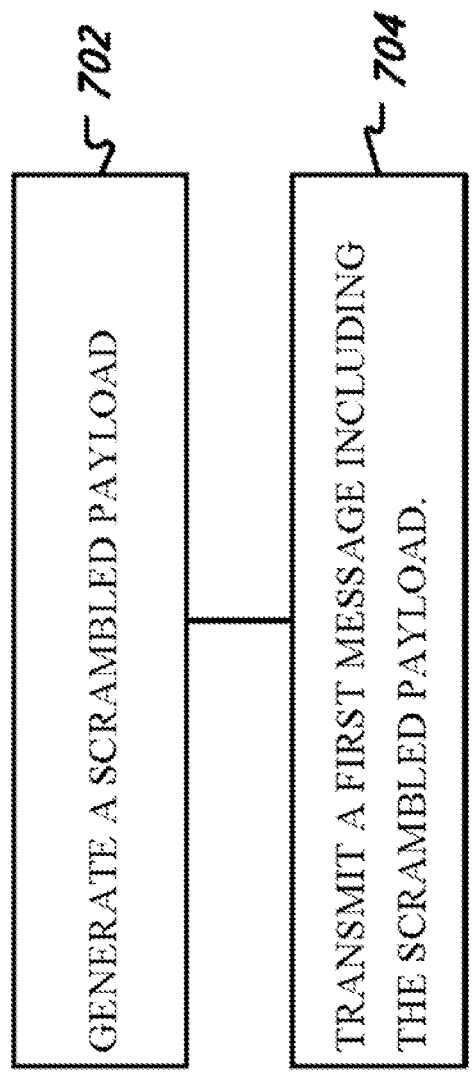
FIG. 7 illustrates a block diagram of an example method for generating a scrambled payload using an initialization scrambling sequence.

FIG. 7 illustrates a block diagram of a method to generate a scrambled payload using an initialization scrambling sequence. The method may include generating, by a wireless device, a scrambled payload, wherein the scrambled payload is generated by using an initialization scrambling sequence that is at least partially based on a preamble index and includes a length of 31 bits (block 702). The initialization scrambling sequence may include the initialization scrambling sequence as described in any of Example Embodiments 1-4 as described herein. The method may also include transmitting, during a random access procedure, a first message to a communication node, the first message including the scrambled payload (block 704). The first message may be part of MSGB transmitted from a UE to a BS, as shown in FIG. 3 of the present disclosure.

In some embodiments, the initialization scrambling sequence includes a radio network temporary identifier (RNTI).

In some embodiments, the initialization scrambling sequence includes a preamble index.

In some embodiments, the initialization scrambling sequence includes a cell identifier.

In some embodiments, the initialization scrambling sequence includes a root index.

In some embodiments, the initialization scrambling sequence includes a random access (RA) RNTI with a 16-bit length, a preamble index with a 6-bit length, and a cell identifier with a 9-bit length.

In some embodiments, the initialization sequence is represented by:

$$c_{init}=\text{RNTI} \cdot 2^{15}+\text{preamble\_index} \cdot 2^{9}+n\_\text{ID, wherein}$$
n_ID is a cell identifier.

In some embodiments, the method includes removing a most significant bit (MSB) of a cell identifier with a 10-bit length, and the initialization scrambling sequence includes a random access (RA) RNTI with a 16-bit length, a preamble index with a 6-bit length, and the cell identifier with a 9-bit length.

In some embodiments, the initialization scrambling sequence includes an RNTI with a 16-bit length, a preamble index with a 6-bit length, and a cell identifier with a 10-bit length, and a most significant bit of the preamble index is combined with the RNTI such that the length of the initialization scrambling sequence includes the length of 31 bits.

In some embodiments, the initialization sequence is represented by:

$$c_{init}=\text{RNTI} \cdot 2^{15}+\text{preamble\_index} \cdot 2^{10}+n\_\text{ID}.$$

In some embodiments, the initialization sequence includes an RA RNTI with a 16-bit length, a preamble index with a 6-bit length, and a configurable identifier (n_ID) with a 9-bit length.

In some embodiments, the initialization sequence is represented by:

$$c_{init}=\text{RA\_RNTI} \cdot 2^{15}+\text{preamble\_index} \cdot 2^{9}+n\_\text{ID}.$$

In some embodiments, the n_ID is derived from a 10-bit root index with one bit removed from the root index, where a preamble of the first message includes an 839-bit length.

In some embodiments, the n_ID is derived from an 8-bit root index, where a preamble of the first message includes a 139-bit length.

In some embodiments, the initialization sequence includes an RA RNTI with a length of 16 bits, a preamble index with a length of 5 bits, and a cell identifier with a length of 10 bits.

In some embodiments, the initialization sequence is represented by:

$$c_{init}=\text{RA\_RNTI} \cdot 2^{15}+\text{preamble\_index} \cdot 2^{10}+n\_\text{ID}.$$

In some embodiments, the method includes determining the RA RNTI using a time-frequency resource of a physical random-access channel (PRACH) instance.

In some embodiments, the method includes removing a most significant bit of the preamble index that includes a 6-bit length, such that the initialization sequence includes an RA RNTI with a 16-bit length, the preamble index with a 5-bit length, and a cell identifier with a 10-bit length.

In another embodiment, a method for wireless communication comprises receiving, during a random access procedure, a first message from a wireless device, the first message including a scrambled payload, and the scrambled payload is generated using an initialization scrambling sequence that is at least partially based on a preamble index and includes a 31-bit length. The method may also include transmitting a random-access downlink transmission to the wireless device in response to receiving the first message.

In some embodiments, the initialization scrambling sequence includes a radio network temporary identifier (RNTI).

In some embodiments, the initialization scrambling sequence includes a preamble index.

In some embodiments, the initialization scrambling sequence includes a cell identifier.

In some embodiments, the initialization scrambling sequence includes a root index.

In some embodiments, the initialization scrambling sequence includes a random access (RA) RNTI with a 16-bit length, a preamble index with a 6-bit length, and a cell identifier with a 9-bit length.

In some embodiments, the initialization sequence is represented by:

$$c_{init}=\text{RNTI} \cdot 2^{15}+\text{preamble\_index} \cdot 2^{9}+n\_\text{ID},$$

wherein n_ID is a cell identifier.

In some embodiments, a most significant bit (MSB) of a cell identifier with a 10-bit length is removed, and the initialization scrambling sequence includes a random access (RA) RNTI with a 16-bit length, a preamble index with a 6-bit length, and the cell identifier with a 9-bit length.

In some embodiments, the initialization scrambling sequence includes an RNTI with a 16-bit length, a preamble index with a 6-bit length, and a cell identifier with a 10-bit length, and a most significant bit of the preamble index is combined with the RNTI such that the length of the initialization scrambling sequence includes the length of 31 bits.

In some embodiments, the initialization sequence is represented by:

$$c_{init}=\text{RNTI}\cdot 2^{15}+\text{preamble\_index}\cdot 2^{10}+n\_\text{ID}.$$

In some embodiments, the initialization sequence includes an RA RNTI with a 16-bit length, a preamble index with a 6-bit length, and an n identifier (n_ID) with a 9-bit length.

In some embodiments, the initialization sequence is represented by:

$$c_{init}=\text{RA\_RNTI}\cdot 2^{15}+\text{preamble\_index}\cdot 2^{9}+n\_\text{ID}.$$

In some embodiments, the n_ID is derived from a 10-bit root index with one bit removed from the root index, where a preamble of the first message includes an 839-bit length.

In some embodiments, the n_ID is derived from an 8-bit root index, where a preamble of the first message includes a 139-bit length.

In some embodiments, the initialization sequence includes an RA RNTI with a length of 16 bits, a preamble index with a length of 5 bits, and a cell identifier with a length of 10 bits.

In some embodiments, the initialization sequence is represented by:

$$c_{init}=\text{RA\_RNTI}\cdot 2^{15}+\text{preamble\_index}\cdot 2^{10}+n\_\text{ID}.$$

In some embodiments, the RA RNTI is configured to be determined using a time-frequency resource of a physical random-access channel (PRACH) instance.

In some embodiments, a most significant bit of the preamble index that includes a 6-bit length is removed, such that the initialization sequence includes an RA RNTI with a 16-bit length, the preamble index with a 5-bit length, and a cell identifier with a 10-bit length, and a preamble_index range is greater than 32.

Figure 8:
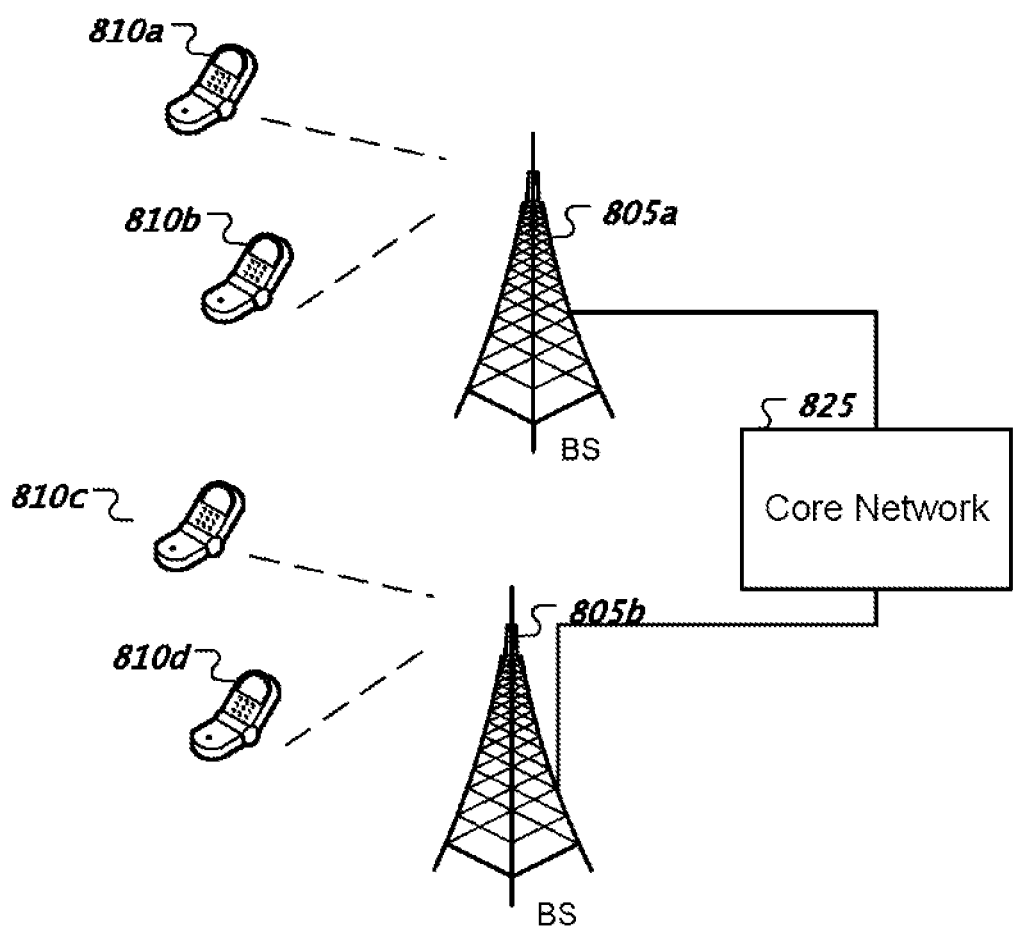
FIG. 8 shows an example of a wireless communication system where techniques in accordance with one or more embodiments of the present technology can be applied.

FIG. 8 shows an example of a wireless communication system where techniques in accordance with one or more embodiments of the present technology can be applied. A wireless communication system 800 can include one or more base stations (BSs) 805*a*, 805*b*, one or more wireless devices 810*a*, 810*b*, 810*c*, 810*d*, and a core network 825. A base station 805*a*, 805*b* can provide wireless service to wireless devices 810*a*, 810*b*, 810*c* and 810*d* in one or more wireless sectors. In some implementations, a base station 805*a*, 805*b* includes directional antennas to produce two or more directional beams to provide wireless coverage in different sectors.

The core network 825 can communicate with one or more base stations 805*a*, 805*b*. The core network 825 provides connectivity with other wireless communication systems and wired communication systems. The core network may include one or more service subscription databases to store information related to the subscribed wireless devices 810*a*, 810*b*, 810*c*, and 810*d*. A first base station 805*a* can provide wireless service based on a first radio access technology, whereas a second base station 805*b* can provide wireless service based on a second radio access technology. The base stations 805*a* and 805*b* may be co-located or may be separately installed in the field according to the deployment scenario. The wireless devices 810*a*, 810*b*, 810*c*, and 810*d* can support multiple different radio access technologies. In some embodiments, the base stations 805*a*, 805*b* may be configured to implement some techniques described in the present document. The wireless devices 810*a* to 810*d* may be configured to implement some techniques described in the present document.

In some implementations, a wireless communication system can include multiple networks using different wireless technologies. A dual-mode or multi-mode wireless device includes two or more wireless technologies that could be used to connect to different wireless networks.

Figure 9:
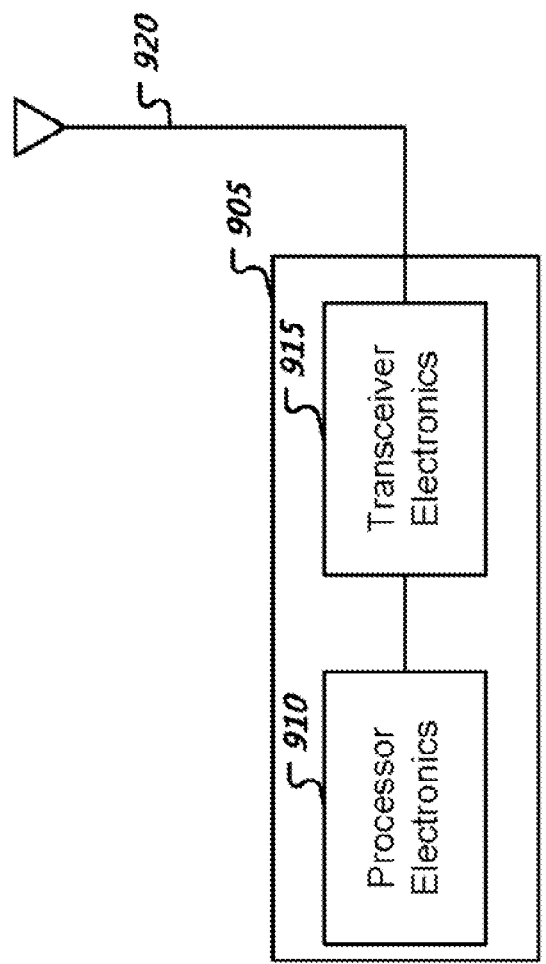
FIG. 9 is a block diagram representation of a portion of a hardware platform.

FIG. 9 is a block diagram representation of a portion of a hardware platform. A hardware platform 905 such as a network device or a base station or a wireless device (or UE) can include processor electronics 910 such as a microprocessor that implements one or more of the techniques presented in this document. The hardware platform 905 can include transceiver electronics 915 to send and/or receive wired or wireless signals over one or more communication interfaces such as antenna 920 or a wireline interface. The hardware platform 905 can implement other communication interfaces with defined protocols for transmitting and receiving data. The hardware platform 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions and network nodes are implemented using the hardware platform 905.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks: and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   generating, by a wireless device, a scrambled payload, wherein the scrambled payload is generated using an initialization scrambling sequence that includes a Radio Network Temporary Identifier (RNTI), a preamble index, and a cell identifier denoted as n_ID, wherein the initialization scrambling sequence is in part represented by the RNTI and in part represented by preamble_index$\cdot 2^{10}$+n_ID, wherein the RNTI has a 16-bit length, the preamble index has a 6-bit length, and the cell identifier has a 10-bit length, and wherein the RNTI comprises a Random Access (RA) RNTI for a first message; and
   transmitting, by the wireless device during a random access procedure, the first message to a communication node, the first message including the scrambled payload.

2. The method of claim 1, wherein a length of the initialization scrambling sequence is 31 bits.

3. A non-transitory computer readable medium having code stored thereon, the code when executed by a processor, causing the processor to implement the method of claim 1, wherein a length of the initialization scrambling sequence is 31 bits.

4. A method for wireless communication, comprising:
   receiving, during a random access procedure, a first message from a wireless device, the first message including a scrambled payload, wherein the scrambled payload is generated using an initialization scrambling sequence that includes an Radio Network Temporary Identifier (RNTI), a preamble index, and a cell identifier denoted as n_ID, wherein the initialization scrambling sequence is in part represented by the RNTI and in part represented by preamble_index$\cdot 2^{10}$+n_ID, wherein the RNTI has a 16-bit length, the preamble index has a 6-bit length, and the cell identifier has a 10-bit length, and wherein the RNTI comprises a Random Access (RA) RNTI for the first message; and
   transmitting a random-access downlink transmission to the wireless device in response to receiving the first message.

5. The method of claim 4, wherein a length of the initialization scrambling sequence is 31 bits.

6. A non-transitory computer readable medium having code stored thereon, the code when executed by a processor, causing the processor to implement the method of claim 4, wherein a length of the initialization scrambling sequence is 31 bits.

7. An apparatus for wireless communication comprising a processor that is configured to:
   generate a scrambled payload, wherein the scrambled payload is generated using an initialization scrambling sequence that includes a Radio Network Temporary Identifier (RNTI), a preamble index, and a cell identifier denoted as n_ID, wherein the initialization scrambling sequence is in part represented by the RNTI and in part represented by preamble_index$\cdot 2^{10}$+n_ID, wherein the RNTI has a 16-bit length, the preamble index has a 6-bit length, and the cell identifier has a 10-bit length, and wherein the RNTI comprises a Random Access (RA) RNTI for a first message; and
   transmit, during a random access procedure, the first message to a communication node, the first message including the scrambled payload.

8. The apparatus of claim 7, wherein a length of the initialization scrambling sequence is 31 bits.

9. An apparatus for wireless communication comprising a processor that is configured to:

receive, during a random access procedure, a first message from a wireless device, the first message including a scrambled payload, wherein the scrambled payload is generated using an initialization scrambling sequence that includes a Radio Network Temporary Identifier (RNTI), a preamble index, and a cell identifier denoted as n_ID, wherein the initialization scrambling sequence is in part represented by the RNTI and in part represented by preamble_index$\cdot 2^{10}$+n_ID, wherein the RNTI has a 16-bit length, the preamble index has a 6-bit length, and the cell identifier has a 10-bit length, and wherein the RNTI comprises a Random Access (RA) RNTI for the first message; and transmit a random-access downlink transmission to the wireless device in response to receiving the first message.

10. The apparatus of claim 9, wherein a length of the initialization scrambling sequence is 31 bits.

\* \* \* \* \*